(12) United States Patent
Dunn et al.

(10) Patent No.: US 8,251,818 B1
(45) Date of Patent: Aug. 28, 2012

(54) REFLEX TRAINING AND IMPROVEMENT SYSTEM

(75) Inventors: Todd Dunn, Arvada, CO (US); Gopinath Venktatramanan, Arvada, CO (US)

(73) Assignee: Reflex L.L.C., Arvada, CO (US)

( * ) Notice: Subject to any disclaimer, the term of this patent is extended or adjusted under 35 U.S.C. 154(b) by 180 days.

(21) Appl. No.: 12/869,954

(22) Filed: Aug. 27, 2010

Related U.S. Application Data

(60) Provisional application No. 61/238,156, filed on Aug. 29, 2009.

(51) Int. Cl.
*A63F 13/00* (2006.01)
(52) U.S. Cl. .......................................... 463/36; 434/112
(58) Field of Classification Search ................ 463/36; 434/112–117
See application file for complete search history.

(56) References Cited

U.S. PATENT DOCUMENTS

| | | | |
|---|---|---|---|
| 4,534,557 | A | 8/1985 | Bigelow et al. |
| 4,818,234 | A | 4/1989 | Redington et al. |
| 4,978,303 | A | 12/1990 | Lampbell |
| 5,171,197 | A | 12/1992 | Healy et al. |
| 5,605,336 | A | 2/1997 | Gaoiran et al. |
| 6,225,547 | B1 | 5/2001 | Toyama et al. |
| 6,555,737 | B2 | 4/2003 | Miyaki et al. |
| 6,565,359 | B2 | 5/2003 | Calhoun et al. |
| 7,618,322 | B2 | 11/2009 | Shimizu et al. |
| 7,625,284 | B2 | 12/2009 | Kay et al. |

*Primary Examiner* — Peter DungBa Vo
*Assistant Examiner* — Jeffrey Wong
(74) *Attorney, Agent, or Firm* — Thorpe North & Western LLP

(57) ABSTRACT

A reflex training system operates on a computer or other processing system, having hand and foot controls for response to stimuli. The use of a computer allows the system to be portable and used in a variety of locations. The system is highly configurable and can be used for training for individuals having different needs and at different levels. The configurability relates to the types of stimuli presented to the user, the types of responses required by the user, and the characteristics of different levels. The system provides a variety of reports relating to performance so that progress can be reviewed. The system can be operated on-line to create a community of users.

18 Claims, 2 Drawing Sheets

REFLEX TRAINING AND IMPROVEMENT SYSTEM

CLAIM OF PRIORITY

The present invention claims priority to U.S. Provisional Application No. 61/238,156 entitled Reflex Training and Improvement System filed on Aug. 29, 2009 which is incorporated herein in its entirety.

FIELD OF THE INVENTION

The present invention relates to a computerized system for improving reflexes and reaction times based upon physical responses to visual stimuli. More particularly, it relates to a system for storing reflex information for multiple users and allowing modification of the training process.

BACKGROUND

A large variety of common tasks require adequate recognition and rapid response. Operating a vehicle is one such task. The driver must respond to a large variety of stimuli and operate a variety of controls to safely maneuver the vehicle. For some people with disabilities, walking or running can require significant reflex control. After injury, a person may require therapy to improve reflexes in order to perform basic functions, or to improve to a previously high level of rapid response. Athletes work to develop significant reflexes in order to compete. Therefore, a need exists for a system to enhance reflexes for different types of processes.

A variety of training methods have been used in the past to train response or reflex behavior by means of creating reaction time type tasks. The goal of such methods is generally to present a random signal, to monitor the trainee's response times, and then provide feedback to the trainee on his/her performance. Typically, such systems are specified for a particular type of reflex. For example, there are a variety of systems for training in the martial arts or for specific sports. In such systems, a device is used to provide signal and the same or another device is used for the trainee to provide a response. The signal is usually the onset or offset of a visual stimulus, such as a light or group of lights, the onset or offset of an auditory stimulus, such as, a tone emitted from a buzzer or speaker, or the thrust of some physical object. When the trainee notices the presentation of the stimulus, he/she is supposed to perform some response, such as a striking behavior. Striking behavior is usually a jab, punch, block, or kick, that results in impacting the target with varying degrees of speed and force. Two general parameters of striking behavior are usually evaluated and fed back to the trainee: simple reaction time and force of the strike. Simple reaction time is the length of delay in seconds between the presentation of a signal and the striking behavior. Force is the measured pressure at the target of the striking behavior. Some systems can record information regarding the reaction time and any other information about the response which is collected. However, these systems often lack personalization.

Some electronic games have been created which also help with reflexes. In such games, the user receives stimulus, such as a light, a sound or an instruction, and has to provide a specific response. If the response is not within a desired reaction time, the player fails. The games can become harder or faster as time progresses. However, such games have little variation or personalization. Typically, performance is not recorded nor relayed to the user.

SUMMARY OF THE INVENTION

The present invention includes a system for reflex training. The system is customizable by the user, a coach or therapist for the individual user. Because the system is customizable, it can include stimuli and responses which are sport specific or specific to a particular user's needs. The stimuli and responses can be adjusted based upon the user's performance and/or development level.

The system is easily used and may be portable. The system may include both hands and both feet in the response requirements. The system records performance information for individuals and can provide individual or group reports. The system allows sharing of performance information.

The system can be operated in a variety of environments. According to one aspect of the invention, the system operates as a stand alone training system and is used in a training environment. According to another aspect of the invention, the system is controlled by a personal computer, such as a desktop or laptop. According to another aspect of the invention, the response controls may be wireless. According to another aspect of the invention, the system includes a gaming console. According to another aspect of the invention, a plurality of systems may be connected together for sharing of information.

According to another aspect of the invention, the system may be controlled by a server connected to a network. A plurality of systems may be connected to the same server. According to another aspect of the invention, a controller connects to the server for adjusting operation of the system for each individual.

DETAILED DESCRIPTION

Figure 1:
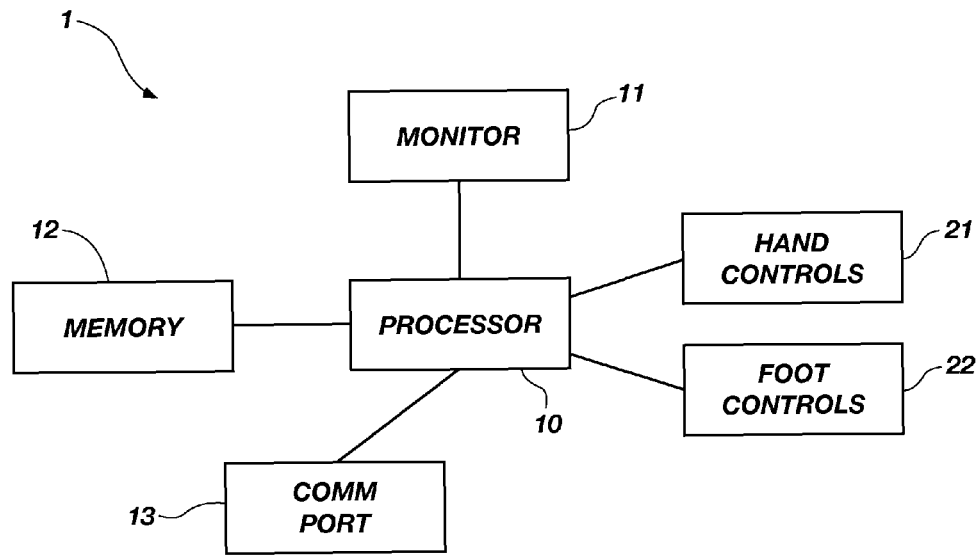
FIG. 1 is a block diagram of the components of a training system according to an embodiment of the invention.

The present invention includes a computer based system for reflex training. According to an embodiment of the invention, the system is based on a personal computer, such as a desktop or laptop. FIG. 1 illustrates components of a computer based reflex system 1 according to an embodiment of the invention. A typical computer as used in connection with the present invention includes a processor 10, monitor 11, memory 12, and optionally a communication port 13. These components are enclosed within a housing or multiple connected housings. Software is stored in the memory 12 and accessed by the processor 10. The processor 10 operates the additional components according to the instructions in the software. Based upon the information regarding operation of the system, a programmer can create software to perform the necessary functions without difficulty. In addition to a computer, the reflex system 1 may be applied to any type of processing system. For example, it could be used with a video game system. In one aspect of the invention, the visual components are projected onto a wall so that multiple users may view the projection simultaneously at the same location.

In addition to the typical computer components discussed above, the reflex system 1 includes hand controls 21 and foot controls 22. These may be of various types for user input. Computers typically have a keyboard and/or mouse which function as hand controls. However, the reflex system 1 of the present invention preferably has hand and foot controls 21, 22 which represent the desired type of response for the reflex being trained. General types of known hand and foot controls 21, 22 may be utilized. The controls for a video game system may be used when it is used as the reflex system. Multiple sets of hand and foot controls 21, 22 may be used to accommodate multiple simultaneous users.

For example, the hand controls 21 may include a mouse or button for use on a desk or tabletop. The hand controls may include some type of game controller with multiple buttons or controls. The hand controls may also include controls which determine motion in multiple directions—left, right, up, down, forward, backward—or rotations. Depending upon the desired reflexes to be trained, specialized controls could be used, such as a steering wheel, airplane or helicopter stick, etc.

Similarly, the foot controls 22 may be of various types. The foot controls may also be simple buttons or pedals which are pressed by the foot. The foot controls may be attached to the feet and sense multiple motions. The foot controls may be incorporated on a floor pad which the user stands. The pad may have a sensor for each foot, or multiple sensors requiring movement of the feet to activate.

The hand and foot controls 21, 22 are connected to the computer, i.e. the processor 10 to provide responses. Preferably, the hand and foot controls 21, 22 are connected wirelessly to the computer. Additional components would be necessary for connecting the hand and foot controls 21, 22 to the processor, either directly or wirelessly. The necessary components, their arrangement and operation would be known to those of skill in the art of computer communications and devices. Computers include various ports allowing input of information. These may include serial ports, parallel ports, modems, USB ports, etc. According to an embodiment of the invention, a wireless receiver is connected to the USB port of the computer. The hand and foot controls 21, 22 transmit signals which can be received by the wireless receiver. The signals are converted to the proper format to provide the information to the processor 10.

Figure 2:
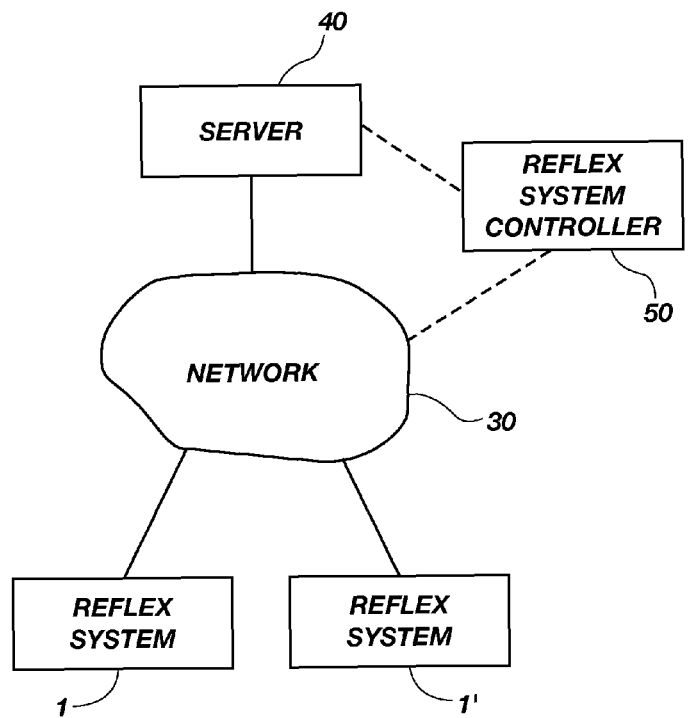
FIG. 2 is a block diagram of the components of a training system according to another embodiment of the invention.

FIG. 2 illustrates a second embodiment of the reflex system of the present invention. In this embodiment, the reflex system is web based. One or more reflex systems 1, 1' similar to the construction of FIG. 1 are connected together through a network 30. The communication port 13 for each reflex system 1, 1' is connected to the network. The communication port 13 may be of any type for connecting computers together. The reflex systems 1, 1' communicate with other reflex systems 1, 1' to share data and operational information, as discussed below.

Alternatively, the reflex systems 1, 1' communicate with a server 40, also connected to the network 30. The server 40 may be used to store data and assist with communication between reflex systems or may be used to operate the system. In an embodiment of the system, the software for operation of the reflex system is stored in memory of the server 40. The reflex systems 1, 1' access the server 40 through the network 30 to operate the software. The software operates through a browser, as is known in the art.

The networked version of the reflex system allows interactive operation and a community of users. Users may compete using the system over the network. The competition may be for simultaneous operation, particularly for a system operating on the server 40. The system can compare users' performance around the globe. As an example, a baseball player (in a certain age and player group) can be compared with other similar players. The system can track and report persons with the fastest reflexes globally and in individual countries, states or localities. The system can track users by types of groups, such as participants on a particular team or in a particular league. The system can also track improvement or changes in performance.

In one aspect of the invention, a user may invite friends or other participants to compete in a tournament or work in a group skill-building activity. In another aspect, group participants may be segmented by age or skill level in order to optimize skill building opportunities.

Figure 3:
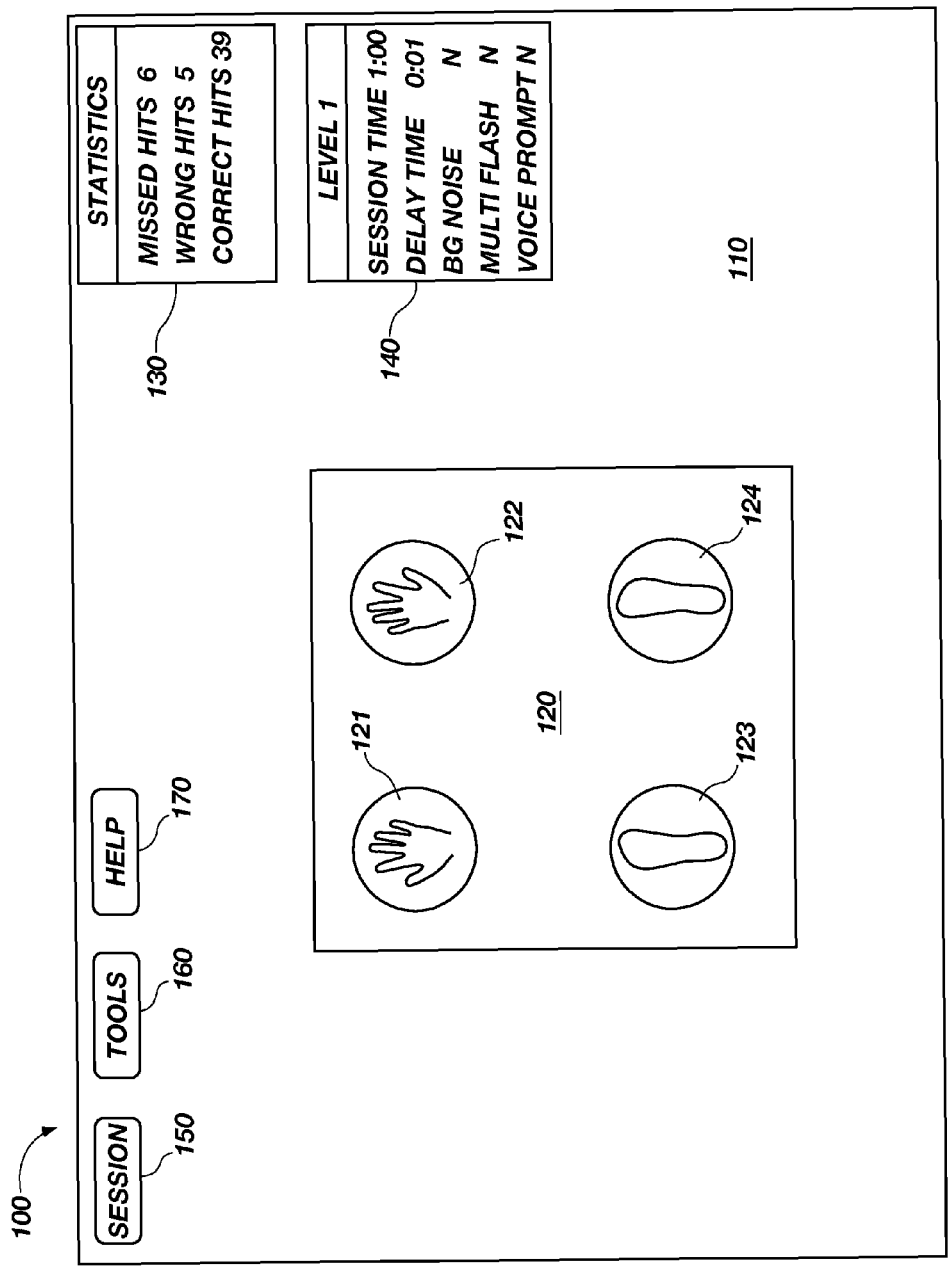
FIG. 3 is screen display according to an embodiment of the invention.

FIG. 3 represents a screen display 100 for use with the reflex system 1 of the present invention. The software displays the screen display 100 on the monitor 11 of the reflex system 1. The screen display 100 shown in FIG. 3 is merely representative of what a display may be. It illustrates various information and capabilities to be displayed. The arrangement and manner for displaying the information and system capabilities are subject to design considerations. As discussed below, the reflex system 1 is highly configurable. The screen display may also be configurable by the user, coach or therapist. The design of the screen display may depend upon the desired reflexes to be trained.

As illustrated in FIG. 3, the screen display 100 includes a background 110. Preferably, the background includes an image related to the subject of the training. For example, the image may be of an athletic field for reflex training relating to sports. The complexity of the background image 110 may interfere with or enhance the stimuli being presented. Different images may be used at different levels to change the characteristics in the stimuli and responses.

The screen display 100 also includes a stimuli panel 120. The stimuli panel 120 presents the stimuli to which the user must respond. The stimuli panel 120 is illustrated as only a portion of the screen display 100. It may include the entire screen display. Multiple stimuli panels may be displayed for use of the system with multiple simultaneous users.

Various types of stimuli may be presented in the stimuli panel. FIG. 3 illustrates the use of four areas—left hand 121, right hand 122, left foot, 123 and right foot 124. In this embodiment, one or more of the areas 121, 122, 123, 124 is illuminated with a color as the stimulus. Multiple areas may be illuminated simultaneously. Different colors may indicate whether to respond or not respond to the stimulus. This provides a cognitive as well as a reaction response. For example, in one aspect of the invention a hand prompt may appear colored green indicating a "go" response whereas a hand prompt appearing as red indicates a "no-go" response. The prompts may also change in size (i.e., height, width, length, etc.) or clarity (i.e., sharp, fuzzy) requiring the user to apply more or less concentration to achieve a desired goal depending on the particular needs of the user and/or recommendations of the coach/trainer. The timing of the prompts is also user configurable to suits the needs and performance of a particular user. Rather than general skill level settings (i.e., easy, medium, difficult), timing may be configured precisely to the needs of the individual user such as sending prompts at 0.5, 5 or 50 second intervals. Advantageously, a coach and/or trainer may work individually with users to enhance skill building at an appropriate skill level.

Upon presentation of a stimulus, the user must activate the proper hand and/or foot controls for that stimulus. The stimulus panel 120 in FIG. 3 is intended for a single button or response for each hand or foot. Depending upon the hand and foot controls 21, 22 used with the reflex system 1, different types of stimulus panels 120 may be used. For example, the stimulus panel may provide an indication of a particular type of motion for a hand and/or foot control which can sense motions. The stimulus panel may indicate one of multiple buttons or controls to activate with a specific hand or foot.

Other types of stimuli may also be used in connection with the reflex system of the present invention. For example, for sports training, the stimulus panel 120 may include an image of a ball moving towards the user in a direction indicative of the required response. For vehicle control training, other vehicles or hazards may be presented which indicate the desired response. The type of stimulus presented to the user may depend upon the selected difficulty level and/or are configurable to each individual user by the user himself or by a coach/trainer.

As a stimulus is presented, the user must respond with the appropriate hand and/or foot control. The reflex system 1 determines and records information regarding the performance of the user in responding. The information which is determined and stored depends upon the desired uses of the reflex system and may be configurable by a user. Preferably, the system determines a reaction time for response to each stimulus. The system may store the response times for all of the stimuli. Of course, this would require significant memory which may be stored locally or at a central network location. The system may determine and store an average response time for all responses within a single session.

The system may also determine information regarding the success of the responses. The system may have a maximum time for a response. If a response is not received within the maximum time, a response is considered missed. Also, the user may respond using the wrong hand or foot control or wrong type of motion with the hand or foot control. The system tracks the number wrong responses and missed responses. The screen display 110 includes a statistics panel 130 for displaying performance statistics. FIG. 3 illustrates display of the number of missed hits, wrong hits and correct hits. Of course, other statistics, such as average response time, may be determined and displayed as well.

For reflex training, the operational characteristics for the system need to vary as the user improves. The reflex system 1 of the present invention has multiple levels with different characteristics. The screen display 100 includes a level panel 140 for displaying characteristics of the level. FIG. 3 illustrates some of the characteristics which may apply to a level. As illustrated in FIG. 3, the level may include a length for a session. The length of a session may be set as a particular time or a particular number of stimuli or correct responses. The level characteristics may also include a setting for the average time between stimuli, maximum response times, and types of interference or stimuli. The system may include interference such as visual or audio background noise. The system may also provide audible as well as visual stimuli. Audible stimuli may be words, music, (voice prompts) or sounds. The audible stimulus is used to distract a user or aid in focusing the attention of the user as suits a particular application. Additionally, the system may include headphones (not shown) which can create left and right audio stimuli for different types of responses.

In one aspect of the invention, the reflex training system 1 utilizes a working memory operation to assist the user in memory and cognitive reflex training. The working memory operation introduces a building sequence of visual or audible stimulus in order to train the user to respond in a series of movements and/or actions. For example, a stimulus sequence might include the following:
 (a) foot
 (b) foot, hand
 (c) foot, hand, foot
 (d) foot, hand, foot, foot
 (e) foot, hand, foot, foot, hand Advantageously, the increasing sequential memory operation noted above assists users in overcoming memory deficiencies and other handicaps. User performance related to the sequential memory operation can be stored and used by a coach and/or trainer to design other appropriate sequential memory operations to optimize the reflex training of the user.

The screen display 100 includes buttons 150, 160, 170 for operating the system. The buttons can be selected for configuring the system or providing assistance to the user.

The reflex system 1 of the present invention is highly configurable to aid in reflex training for different types of users and response activities. A user will log into the system using a username and password. Of course, for a stand alone system, a username and password may not be required since it does not need to accommodate multiple users. The system is configured for the particular user. The reflex system 1 can be configured using the system itself or a separate controller 50, illustrated in FIG. 2. For the networked configuration, a coach or therapist can use a controller 50, which may be a networked computer, to access the data or software on the server 40 to selected or change the configurable aspects of the system. The controller 50 could also be used to access a reflex system 1 on the network to change characteristics, if the software is being run on that system.

Configuration may include the background image 110, the level characteristics, the controls being used, and the stimuli presented. Different users may use different types of controls. For example, some may use simple buttons while others use controls which sense motion. Some users may have disabilities which prevent use of some controls. For example, the system can accommodate users with missing limbs, fingers, or other handicaps. For such users, stimuli are not presented for activation of the controls which cannot be used. In one aspect of the invention, particular settings are employed to assist users in developing fine motors skills help them overcome problems associated with missing fingers such that remaining fingers are trained to compensate for the loss of the other digits. For example, in one embodiment, a controller is equipped only with buttons that correspond to the available fingers of a user but is configured to force the user to learn to use his available fingers to achieve goals that would normally be accomplished by other available fingers. In another embodiment controllers are configured to require a user with a missing limb to accomplish goals that are normally accomplished with two limbs (i.e., driving, swimming, golfing, etc.).

With respect to the background images, the image is selected for a specific type of user. For baseball players, the image may be a baseball stadium. The image may also vary by the user's location or favorite team. The system stores information regarding the user's desires and uses proper images for that user. The presented stimuli may also vary based upon the user's desires. In one aspect of the invention, background video may be employed to simulate sights of a baseball stadium, a race track, or other suitable video configuration.

The system can be configured by the user, but preferably is configured for each user by a coach or therapist. This allows the system to be more than a game. It allows the coach or therapist to create a true reflex training system. The coach or therapist creates usernames and passwords for their players or patients. The coach or therapist sets the configurable aspects of the system for each user. The coach or therapist can create standard configurations to be used with all players/patients or various subsets. The on-line capabilities of the system allow configurations to be shared among coaches/therapists, so that improved training programs can be developed for particular types of users.

The configurability of the system relates principally to the types of stimuli presented, responses expected, and level characteristics. As noted above, the system can accommodate a large variety of types of stimuli. The coach or therapist may select certain types of stimuli to be used with specific users. The stimuli may be static for a user, may vary by levels and/or may very by time. Types of stimuli may be randomly selected each time that a user logs in. The types of responses and controls may also be configured.

Characteristics of levels are also configurable. This allows the system to be utilized with users of widely varying capabilities. The coach or therapist can set the session time for each level, the average, deviation, and/or range for times between stimuli, maximum response times for correct hits, and interference characteristics.

The coach or therapist can further set the requirements for proceeding to subsequent levels and/or make specific modifications to train a particular user's abilities or skills. Since the system records and stores information for individual users, any of the stored information can be used to allow level advancement. For example, a user can advance to a subsequent level based characteristics such as average reaction time, percentage of correct hits in a session, multiple sessions meeting reaction times or correct hit numbers, etc.

In one aspect of the invention, the system is programmed to monitor user performance and recommend session protocols to improve performance in areas where the user performs poorly. For example, if a user consistently has slower reflex timing in a particular stimulus environment utilizing the left hand, the system will identify and recommend training protocols that will focus on enhancing user performance of the left hand.

The system allows review of performance by the user or coach/therapist. Some performance information is provided on the screen display 100. Other performance information is shown in separate reports of the stored data. Different types of reports are possible. Some reports relate to a particular individual. Other reports will relate to sets of users, such as members of a team.

Reports may include any of the data stored by the system. Reports may include all reactions times, average reaction times per session, range of reaction times per session, fastest reaction times, and reaction times (all, average, range or fastest) by type of stimulus or type of control. Reports may include information on hits in a session, such as number of missed hits, number of wrong hits, and number of correct hits. These numbers can be provided for each session or by average for a given level. The large variety of reports give the trainer, coach, or therapist the ability to better understand improvements and areas needing improvement. The system can then be configured to address areas needing improvement on an individual basis.

The system can be configured to be used in therapy sessions where a therapist will be able to prescribe a routine/protocol for a patient who needs to have an isolated focus and measurable feedback on their reflexes. The system can also be used by the patient to follow the protocol when not in the therapist's office.

In one aspect of the invention, the reflex training system is utilized to track the user's extracurricular activity and correlate those activities to the user's performance. For example, the amount of sleep a user obtains, the diet of the user, the amount and type of supplements and/or medications consumed by the user, and the time of day a user participates in reflex training can all be input into the system. That information may be charted and reviewed by a coach/trainer to better understand tertiary influences on user reflex behaviors and performance.

Since the reflex system records information regarding use and performance, it can be used to track time and progress so that a therapy center can be reimbursed for patient usage. It can also be used to track usage to ensure that the system is being used and that individuals are progressing.

Having disclosed at least one embodiment of the present invention, various adaptations, modifications, additions, and improvements will be readily apparent to those of ordinary skill in the art. Such adaptations, modifications, additions and improvements are considered part of the invention which is only limited by the several claims attached hereto.

The invention claimed is:

1. A method executed by a game platform comprising a processor configured for rendering, on a screen display, a reflex training system, the method comprising:
   sequentially displaying at specific user configurable intervals via the screen display a plurality of visual stimuli comprising a combination of at least two of the following:
   (i) a hand,
   (ii) two hands,
   (iii) a foot,
   (iv) two feet,
   (v) one hand and one foot,
   (vi) two hands and one foot,
   (vii) one hand and two feet, or
   (viii) two hands and two feet;
   responding to the sequential display of visual stimuli via game controllers associated with the hands or feet of the user;
   recording the time between the sequential display of the visual stimuli and the response to the display by the user;
   recording the response via the game controllers and determining if the response corresponded to the visual stimuli;
   evaluating the response time between visual stimuli and the response by the user and the number of responses that accurately corresponded to the visual stimuli;
   modifying the timing and sequence of the visual stimuli to improve the response of the user to the visual stimuli;
   identifying the most incorrect responses associated with a particular limb of a user in response to pre-determined visual stimuli; and
   recommending a sequence of visual stimuli timing intervals between visual stimuli to improve user responses associated with the limb.

2. The method of claim 1, wherein the game controllers are configured to teach users with missing fingers to improve the dexterity of the user using the available fingers.

3. The method of claim 1, wherein a third party evaluates the response time between visual stimuli and the response by the user and the amount of responses that accurately correspond to the visual stimuli and modifies the timing and sequence of the visual stimuli of the game platform to improve the response of the user to the visual stimuli.

4. The method of claim 1, further comprising color-coding the visual stimuli to prompt the user to respond or not to respond to the visual stimuli.

5. The method of claim 1, further comprising providing an audible stimulus to prompt the user to respond or not to respond to the visual stimuli.

6. The method of claim 1, further comprising identifying the slowest response times associated with a particular limb of a user in response to pre-determined visual stimuli.

7. The method of claim 1, wherein the timing between visual stimuli may be set from between 0.5 and 50 seconds by the user.

8. A computer program product, tangibly embodied in a computer readable medium for rendering on a screen display visual stimuli to assist the user in improving reflex skills, the computer program product including executable instructions operable to cause a game platform to:

sequentially display at specific user configurable intervals via the screen a plurality of visual stimuli;

process the response to the sequential display of visual stimuli received from game controllers associated with the hands or feet of the user;

record the time between the sequential display of the visual stimuli and the response to the display by the user;

record the response via the game controllers and determining if the response corresponded to the visual stimuli;

provide data related to the response time between visual stimuli and the response by the user and the number of responses that accurately corresponded to the visual stimuli;

permit user modification of the specific timing and specific sequence of the visual stimuli to improve the response of the user to the visual stimuli;

identify the most incorrect responses associated with a particular limb of a user in response to pre-determined visual stimuli; and recommend a sequence of visual stimuli timing intervals between visual stimuli to improve user responses associated with the limb.

9. The computer program product of claim 8, wherein the executable instructions further cause the program to color-code the visual stimuli to prompt the user to respond or not to respond to the visual stimuli.

10. The computer program of claim 8, wherein the executable instructions further cause the program to provide an audible stimulus to the prompt the user to respond or not to respond to the visual stimuli.

11. The computer program of claim 8, wherein the executable instructions further cause the program to identify the slowest response times associated with a particular limb of a user in response to pre-determined visual stimuli.

12. The computer program of claim 11, wherein the executable instructions further cause the program to identify and recommend a sequence of visual stimuli timing interval between visual stimuli to improve user responses associated with the limb.

13. A system comprising:
a display device; and
a game platform comprising a processor, the processor configured to:
sequentially display at specific user configurable intervals via the screen a plurality of visual stimuli comprising a combination of hands or feet;
process the response to the sequential display of visual stimuli received from game controllers associated with the hands or feet of the user;
record the time between the sequential display of the visual stimuli and the response to the display by the user;
record the response via the game controllers and determining if the response corresponded to the visual stimuli;
provide data related to the response time between visual stimuli and the response by the user and the number of responses that accurately corresponded to the visual stimuli; and
permit user modification of the specific timing and specific sequence of the visual stimuli to improve the response of the user to the visual stimuli;
identify the most incorrect responses associated with a particular limb of a user in response to pre-determined visual stimuli; and
recommend a sequence of visual stimuli timing intervals between visual stimuli to improve user responses associated with the limb.

14. The system of claim 13, wherein the sequential display of visual stimuli comprises an increasing sequential memory operation.

15. The system of claim 13, wherein the processor is further configured to receive and store information regarding the amount of sleep a user has obtained and compare that information to the user's responses to the visual stimuli.

16. The system of claim 13, wherein the processor is further configured to receive and store information regarding the diet of the user and compare that information to the user's responses to the visual stimuli.

17. The system of claim 13, wherein the system further comprises a network connection to a storage device configured to store information related to the user's responses to the visual stimuli.

18. The system of claim 13, further comprising a network connection to other systems permitting multiple users to simultaneously view the same visual stimuli.

* * * * *

UNITED STATES PATENT AND TRADEMARK OFFICE
CERTIFICATE OF CORRECTION

| | | |
|---|---|---|
| PATENT NO. | : 8,251,818 B1 | Page 1 of 1 |
| APPLICATION NO. | : 12/869954 | |
| DATED | : August 28, 2012 | |
| INVENTOR(S) | : Todd Dunn and Gopinath Venkataramanan | |

It is certified that error appears in the above-identified patent and that said Letters Patent is hereby corrected as shown below:

Title page, Item 75, Inventor's name:

Gopinath Venktatramanan should be Gopinath Venkataramanan

Signed and Sealed this
Thirteenth Day of November, 2012

David J. Kappos
*Director of the United States Patent and Trademark Office*